(12) United States Patent
Galletti et al.

(10) Patent No.: US 11,031,152 B2
(45) Date of Patent: Jun. 8, 2021

(54) FLAME- RETARDANT ELECTRICAL CABLE

(71) Applicants: Prysmian S.p.A., Milan (IT);
Politecnico di Milano, Milan (IT)

(72) Inventors: Franco Galletti, Casatenovo (IT);
Elena Roda, Segrate (IT); Giuseppe Merigo, Milan (IT); Sergio Gutierrez, Vilanova y la Geltru (ES)

(73) Assignees: Prysmian S.p.A., Milan (IT);
Politecnico di Milano, Milan (IT)

(*) Notice: Subject to any disclaimer, the term of this patent is extended or adjusted under 35 U.S.C. 154(b) by 0 days.

(21) Appl. No.: 16/837,076

(22) Filed: Apr. 1, 2020

(65) Prior Publication Data

US 2020/0343021 A1    Oct. 29, 2020

(30) Foreign Application Priority Data

Apr. 25, 2019   (EP) .................... 19382315

(51) Int. Cl.
*H01B 7/295* (2006.01)
*C08K 3/016* (2018.01)
(Continued)

(52) U.S. Cl.
CPC ............ *H01B 7/295* (2013.01); *C08K 3/016* (2018.01); *C08K 3/22* (2013.01); *C08K 5/0066* (2013.01); *C08L 23/06* (2013.01); *C09K 21/02* (2013.01); *C09K 21/06* (2013.01); *C08L 2201/02* (2013.01); *C08L 2203/202* (2013.01); *C08L 2207/06* (2013.01)

(58) Field of Classification Search
CPC .......... C08K 3/016; C08K 3/22; C08K 23/06; C08K 21/02; C08K 21/06; C08K 2201/02; C08K 2203/202; C08K 2207/06; H01B 7/02; H01B 7/04; H01B 7/06; H01B 7/295
USPC .......................................... 174/110 R–110 E
See application file for complete search history.

(56) References Cited

U.S. PATENT DOCUMENTS 4,515,633 A * 5/1985 Cruz, Jr. ................ C09K 21/02
106/122
6,492,453 B1 * 12/2002 Ebrahimian ........... B82Y 30/00
524/447

(Continued)

FOREIGN PATENT DOCUMENTS

| JP | 2007-70483 A | 3/2007 |
| JP | 2016-204471 A | 12/2016 |
| WO | 2006026256 A1 | 3/2006 |

OTHER PUBLICATIONS

Vanier, Cecile; European Search Report issued in European Patent Application No. 19382315; completed on Oct. 4, 2019; 3 pages.

*Primary Examiner* — William H. Mayo, III
(74) *Attorney, Agent, or Firm* — Ulmer & Berne LLP

(57) ABSTRACT

A flame-retardant electric cable has a core including at least one electric conductor, an electrically insulating coating and an outermost layer made from a substantially thermoplastic, low smoke zero halogen flame-retardant polymer composition. The composition includes a polymeric base made of at least one polyethylene homopolymer or copolymer having a density of 0.94 g/cm$^3$ at most. The composition further includes 60-64% by weight of a metal hydroxide, at least 2% by weight of an ammonium coated montmorillonite having average particle dimensions of from 5 to 20 μm, and a polysiloxane.

12 Claims, 1 Drawing Sheet

Figure 1:
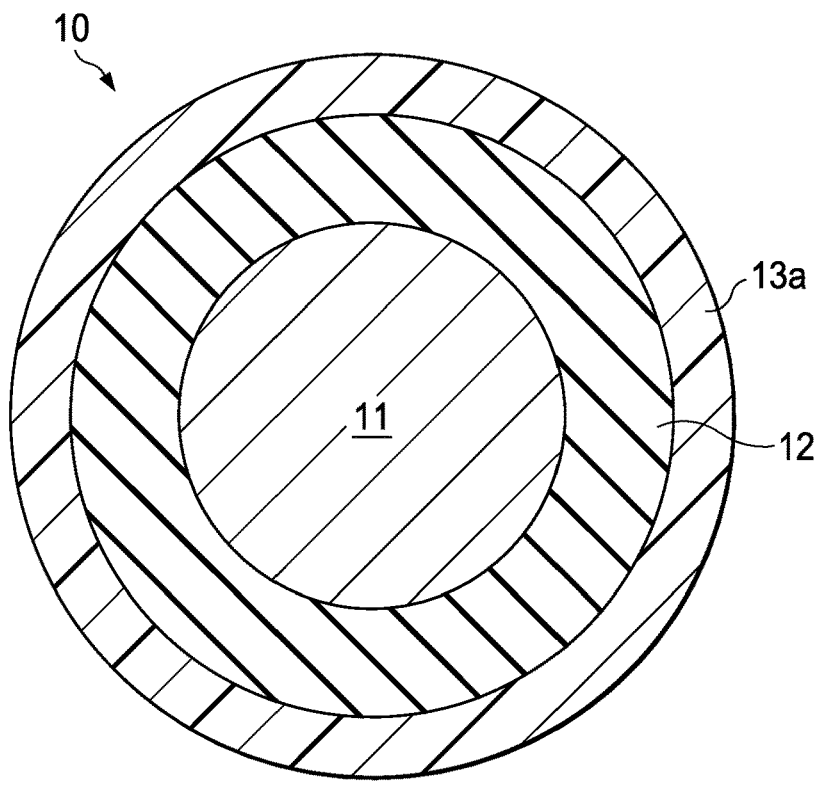

(51) Int. Cl.
*C08K 3/22* (2006.01)
*C08K 5/00* (2006.01)
*C08L 23/06* (2006.01)
*C09K 21/02* (2006.01)
*C09K 21/06* (2006.01)

(56) References Cited

U.S. PATENT DOCUMENTS

| | | | |
|---|---|---|---|
| 7,438,748 B2 | 10/2008 | Cogen et al. | |
| 7,504,451 B1 | 3/2009 | Brown et al. | |
| 2004/0024101 A1* | 2/2004 | Hayes | C08L 67/02 524/445 |
| 2004/0024102 A1* | 2/2004 | Hayes | C08L 69/00 524/445 |
| 2006/0142460 A1* | 6/2006 | Cogen | C08K 3/016 524/445 |
| 2008/0110663 A1 | 5/2008 | Jow et al. | |
| 2008/0251273 A1* | 10/2008 | Brown | H01B 7/295 174/113 R |
| 2013/0161060 A1 | 6/2013 | Ponce Ibarra et al. | |

\* cited by examiner

FLAME-RETARDANT ELECTRICAL CABLE

FIELD OF APPLICATION

The present disclosure relates to a flame-retardant electrical cable.

In particular, the present disclosure relates to a flame-retardant, low-smoke and zero-halogen (LS0H) electrical cable which exhibits reduced dripping (occurrence of droplets) when exposed to high temperatures, e.g. in case of fire.

The cable according to the disclosure can be used particularly for low-voltage (LV) applications.

PRIOR ART

As known, an important requirement for electric cables, especially for building application, is a good behaviour in case of fire (as specified for example in the standard IEC 60332-3-24 (2000)), so as to avoid flame propagation and smoke generation in houses or, more generally, in premises where persons reside. The general performances against fire are mainly assured by the electric insulation or by the cable outer jacket which should have certain properties in case of fire.

In this connection, it is known to produce the insulating coating of electric cables from a polymeric composition provided with fire resistance and/or flame-retardant properties through the addition of suitable fillers. In particular, the production of flame-retardant cables is currently directed towards the use of halogen-free and low-smoke materials (LS0H) using polyolefin-based compositions for the insulating layer (e.g. polyethylene and/or polyethylene copolymers, optionally cross-linked) filled with inorganic hydroxides fillers, such as magnesium hydroxide and/or aluminium hydroxide, which confer flame-retardant properties to the insulating layer.

However, in order to obtain a satisfactory flame retarding effect, it is necessary to introduce substantial amounts of inorganic filler in the polymeric material, which significantly worsens the mechanical properties of the polymeric material as well as its workability with particular reference to the extrusion of the polymeric composition.

In addition, under certain circumstances it is required that the electric cables, for example, marine cables, have an outer jacket that is not only flame retardant, but also has a low or null dripping, i.e. in case of fire it should not easily burn, neither melt, because if so, it could expose the electrical conductor and/or further feed the fire by hot bits detaching therefrom.

The flame retardancy and low/null dripping of an electric cable can be evaluated for compliance with and certified by national and/or international standards.

Some standards, particularly international standards, are more and more stringent about the performances required to a flame-retardant cable to the end of improving the safety in buildings in case of fire.

The addition of flame-retardant fillers, such as magnesium hydroxide and/or aluminium hydroxide to the polymeric base material of the cable insulating coating certainly enhances the effectiveness against flame progression but has few impacts on the containment of the dripping when the cable is exposed to high temperatures e.g. in case of fire.

JP 2016204471 discloses a cable insulating non-halogen flame retardant resin composition containing 100 mass parts of polyolefin resin, 150-250 mass parts of metal hydroxides and 1-50 mass parts of organo clay surface-treated with silicone. As polyolefin resin, linear-low-density-polyethylene (LLDPE) and linear very-low-density-polyethylene (VLDPE) are envisaged. As organo clay surface-treated with silicone, montmorillonite is more suitably, preferably treated with a quaternary amine such as quaternary amine with $C_{10}$-$C_{20}$ alkyl group or more in one of the four functional groups bonded with a nitrogen atom. The clay is said to be a silicate whose thickness of a layer is about 1 nm.

U.S. Pat. No. 7,438,748 discloses a flame-retardant composition that is useful for wire-and-cable applications. The flame-retardant composition comprises a polyolefin polymer and a three-component flame retardant additive consisting essentially of: (i) a nano-silicate present in an amount between 0.1% and 15% by weight), (ii) a metal hydroxide, and (iii) calcium carbonate. The nano-silicate has at least one dimension in the 0.9 to 200 nanometer-size range and can be a layered nano-silicate. In the more preferred embodiment, the layered nano-silicates is montmorillonite, optionally treated with dimethyl, di(hydrogenated tallow) ammonium. Suitable polyolefin polymers include ethylene polymers. The polyethylenes can have a density in the range of 0.860 to 0.960 g/cc. Linear low density polyethylenes (LLDPEs), very low density polyethylenes (VLDPEs), and metallocene copolymers are envisaged.

JP2007070483 discloses a flame-retardant composition for cable coating having an ethylene-type polymer as a main component and comprising, per 100 weight parts of ethylene-type polymers, (a) 30-100 weight parts of metal hydroxides, and (b) 1-10 weight parts of nano clays. The nanoclay (b) is a layered structure such as bentonite or mainly composed of montmorillonite, having a particle diameter (X-Y dimension) of 1000 nm or less, a thickness (dimension in the Z direction) of 10 nm or less. A layered nanoclay having a surface modified with distearyl dimethyl ammonium chloride is preferably used.

US20130161060 discloses a flame and drip resistant halogen-free insulating composition comprising from 35% to 65% by weight of low-density polyethylene, from 0.1% to 15% by weight of at least one polyolefin grafted with maleic anhydride, from 5% to 45% by weight of at least one flame retardant (magnesium or aluminium hydroxide), and from 10% to 60% by weight of at least one filler, which can be bentonite.

U.S. Pat. No. 6,492,453 discloses a composition useful for electrical insulation, insulation skin, jacket (sheath) for electrical cables, the composition comprising: (a) a base polymer selected from the group consisting of at least one polyolefin polymer; (b) a filler comprising at least one substance selected from the group consisting of metal hydrates and oxides; (c) an additive comprising at least one substance selected from the group consisting of an antioxidant, an organosilane, a pigment and a lubricant; (d) an unsaturated dicarboxylic anhydride; and (e) a nanoclay filler. The nanoclay filler is selected from the group consisting of synthetic silicate montmorillonites and natural layered silicate montmorillonites. The individual platelets are approximately 1 micron in diameter.

SUMMARY OF THE DISCLOSURE

In view of the above, a main object of the present disclosure is providing a flame-retardant electric cable, in particular a flame-retardant electric cable for low-voltage applications, having improved fire performances, particularly reduced or no dripping (occurrence of droplets) when exposed to flame, so as to meet the stricter requirements for certification according to the current international standards.

Another object of the present disclosure is providing a flame-retardant electric cable as above which, in addition to having improved performances under fire, has good mechanical properties and is easily workable, particularly in extrusion processes.

The Applicant found that an electric cable has improved flame-retardant properties, particularly a reduced or null dripping under fire, when its outermost layer comprises a modified montmorillonite having micrometric particle dimensions.

Accordingly, the present disclosure relates to a flame-retardant electric cable having a core comprising at least one electric conductor, an electrically insulating coating, and an outermost layer made from a substantially thermoplastic, low smoke zero halogen (LS0H) flame-retardant polymer composition comprising:

a) a polymeric base made of at least one polyethylene homopolymer or copolymer having a density of 0.94 g/cm$^3$ at most;
b) 60-64% (180-220 phr) by weight of a metal hydroxide;
c) at least 2% (about 5 phr) by weight of an ammonium coated montmorillonite having average particle dimensions of from 5 to 20 μm; and
d) a polysiloxane.

In an embodiment, the outermost layer is a jacket.

In another embodiment, the outermost layer is a skin layer covering the jacket. In an embodiment, the skin layer has a thickness of from 0.05 to 0.5 mm.

The Applicant found that a cable provided with the outermost layer made from a flame-retardant composition as specified above has improved reaction to fire performances, especially regarding a lower dripping or absence of dripping during burning. In addition, the Applicant found that the provision of an outermost layer as specified above allows to impart suitable flame-retardant properties and improved resistance to dripping under fire to the cable without impairing its mechanical properties as well as easing the workability of the polymer material forming the outermost layer, particularly in the extrusion step.

DETAILED DESCRIPTION

For the purpose of the present description and of the appended claims, the words "a" or "an" should be read to include one or at least one and the singular also includes the plural unless it is obvious that it is meant otherwise. This is done merely for convenience and to give a general sense of the disclosure.

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

Moreover, in the present description, it is to be understood that the technical features described specifically above and below can be combined with each other in any way, constituting further embodiments of the present disclosure which may not be specifically described for conciseness, but which fall within the scope of the present disclosure.

In the present description and claims, unless specified otherwise, the percentages by weight are based on the total weight of the flame-retardant polymer composition. In some instance, the amount of the components of the flame-retardant polymer composition is given in phr where, in the present description and in the appended claims, the term "phr" is used to indicate parts by weight per 100 parts by weight of the base polymeric material.

The cable according to the disclosure can be used particularly for low-voltage (LV) applications. In the present description and the appended claims, as "low voltage cable" it is meant a voltage equal or less than about 1 kV.

The cable of the present disclosure is particularly suitable to transport and distribute electric current for power and for telecommunication.

Figure 2:
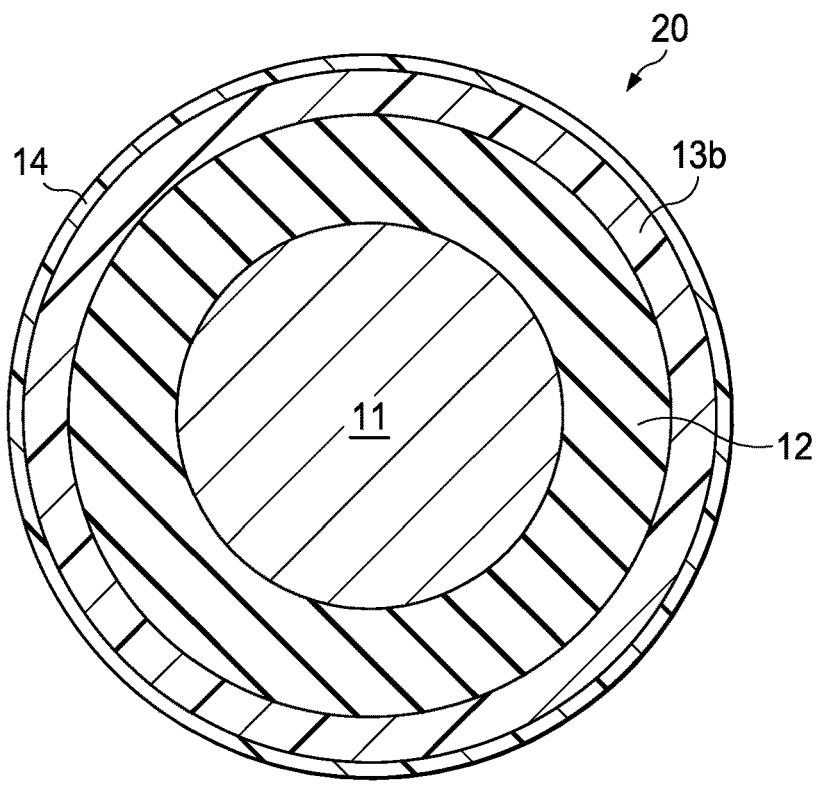

The features and advantages of the present disclosure will be made apparent by the following detailed description of some exemplary embodiments thereof, provided merely by way of non-limiting examples, description that will be conducted also by referring to the attached drawings, wherein FIG. 1 is a cross-sectional view of an electric cable according to the present disclosure; and FIG. 2 is a cross-sectional view of another electric optical cable according to the present disclosure.

FIG. 1 shows a cable 10 according to a non-limiting embodiment of the disclosure. Cable 10 has a core comprising a conductor 11 made of an electrically conductive material, e.g. aluminium, copper, carbon nanotubes or composite thereof. The conductor 11 may be in the form of a solid bar or a of bundle of wires, preferably stranded.

In the cable of the disclosure, the core may include a single conductor or preferably a plurality of conductors.

The conductor 11 is electrically insulated by an insulating layer 12 in form of an extruded polymeric coating optionally having flame-retardant properties. For example, the insulating layer 12 can be made of an extruded polymeric material such as polyethylene or a polyethylene mixture, optionally filled with flame-retardant fillers, such as magnesium or aluminium hydroxide.

In the embodiment shown in FIG. 1, the insulating layer 12 is extruded in direct contact with the conductor 11.

Cable 10 comprises a jacket 13a as outermost layer, made of the polymeric material having flame-retardant properties according to the present disclosure. The jacket 13a surrounds the insulating layer 12 and, optionally, is in direct contact thereof. The jacket 13a is manufactured by extrusion. The jacket 13a has a thickness suitable for providing the cable with mechanical protection.

FIG. 2 shows a cable 20 according to another non-limiting embodiment of the disclosure. In the cable 20, those features that are structurally and/or functionally equivalent to corresponding features of the cable 10 described above will be assigned the same reference numbers of the latter and will not be further described for conciseness.

The cable 20 differs from the cable 10 described above in that the outermost layer is a skin layer 14, made of the polymeric material having flame-retardant properties according to the present disclosure. The skin layer 14 surrounds and directly contacts the jacket 13b. The skin layer 14 is manufactured by extrusion. The skin layer 14 has a thickness substantially smaller than that of the jacket 13b (of from 0.05 to 0.5 mm, for example of from 0.1 to 0.2 mm) and does not provide significant mechanical protection to the cable 20.

In this embodiment, the jacket 13b is made of a LS0H polymer composition. A composition suitable for the jacket of the present cable is, for example, similar to that use for the outermost layer but lacking any ammonium coated montmorillonite.

The outermost layer of the cable of the disclosure, being either a jacket (as in the case of the cable 10 of FIG. 1) or a skin layer (as in the case of the cable 20 of FIG. 2) is made from a flame-retardant polymer composition described above.

A polyethylene homopolymer or copolymer as polymeric base of the present polymer composition can be a homopolymer of ethylene (such as a low density polyethylene, LDPE; very low density polyethylene, VLDPE; ultra low density polyethylene, ULDPE) or a copolymer of ethylene with one or more alpha-olefins having 3 to 12 carbon atoms, for example 4 to 8 carbon atoms, and, optionally, comprising a diene, such as an ethylene-propylene rubber (EPR) or a linear low density polyethylene (LLDPE). Examples of the alpha-olefins are propylene, 1-butene, 1-hexene, 4-methyl-1-pentene, and 1-octene.

In an embodiment, the polymeric base of the present polymer composition is made of at least one polyethylene copolymer, like a linear low density polyethylene (LLDPE), or of a mixture thereof.

In an embodiment, at least one polyethylene copolymer of the polymeric base of the present polymer composition is a metallocene LLDPE.

The polyethylene homopolymer or copolymer have a density of 0.94 g/cm$^3$ at most. In an embodiment, the polyethylene homopolymer or copolymer have a density in the range of 0.86 to 0.92 g/cm$^3$.

The flame-retardant polymer composition of the present disclosure further comprises a metal hydroxide in amount of 60 to 64 wt % corresponding to about 180-220 phr.

If the amount of the least metal hydroxide is below 60 wt %, the flame retardancy properties may be insufficient whereas if the amount of the least metal hydroxide is above 64 wt % the mechanical properties of the flame-retardant composition, especially its elongation characteristics, might be reduced to an inacceptable extent.

In an embodiment, the metal hydroxide is selected from magnesium hydroxide, aluminium hydroxide or a combination thereof. An example of metal hydroxide suitable for the present cable is magnesium hydroxide, for example of natural origin (brucite), optionally surface-treated.

The flame-retardant polymer composition of the present disclosure further comprises an ammonium coated montmorillonite having average particle size dimensions of from 5 to 20 µm as inorganic fillers.

The montmorillonite having average particle size dimensions of from 5 to 20 µm may be naturally occurring and is preferably layered. In an embodiment, the naturally occurring montmorillonite may be purified according to conventional purification processes before its use in the flame-retardant polymer composition of the present disclosure.

The amount of the ammonium coated montmorillonite in the flame-retardant polymer composition is at least 2 wt % (corresponding to about at least 5 phr).

In an embodiment, the amount of ammonium coated montmorillonite in the flame-retardant polymer composition is in the range from 2 to 8 wt % (corresponding to about 6-26 phr). An amount of ammonium coated montmorillonite lower than 2 wt % brings no substantial effect in the flame-retardant polymer composition; while an amount of ammonium coated montmorillonite greater than 8 wt % can cause a decrease of the mechanical feature of the composition, especially in term of tensile strength and elongation at break, thus making the composition no more suitable for an electric cable.

Some of the cations (for example sodium ions) in the ammonium coated montmorillonite are exchanged, by surface treating the montmorillonite, with an ammonium cation-containing compound, such as a salt. Suitable ammonium coated montmorillonites for the present cable contain alkyl ammonium and polyol ammonium. In an embodiment, the ammonium coated montmorillonite contains (is surface treated with) dimethyl, di(hydrogenated tallow) ammonium.

The cationic coating allows to increase the compatibility of montmorillonite with the polymeric matrix.

Applicant experienced that the presence of ammonium coated montmorillonite having micrometric particle dimensions as indicated above in the flame-retardant polymeric composition used for the manufacture of the outermost layer of the cable not only contributes to improve the flame-retardant properties in combination with the metal hydroxide, but also increases significantly the resistance to dripping of the polymeric material forming such coating. In particular, Applicant experienced that montmorillonite having micrometric particle dimensions as indicated above promotes the formation of cohesive carbon residues ("char") of such outermost layer when it is exposed to a flame, for example in the event of a fire, which results in a reduction of the dripping of the polymeric material forming such coating and in a significant increase of the fall time of incandescent fragments of the polymeric material, e.g. during the flame test.

Thus, when the flame-retardant composition of the present disclosure is used for the manufacture of the outermost layer of the cable (e.g. the jacket or a skin layer coating the jacket), ammonium coated montmorillonite as specified above promotes, under fire, the formation a surface crust made substantially of cohesive carbon residues (char) and having reduced gas permeability, which protects the underlying part of the insulating coating preventing its burning and dripping for a significantly extended period of time.

Furthermore, ammonium coated montmorillonite being a component with flame-retardant properties allows achieving the desired flame retardancy performances, while contributing to maintain advantageously good mechanical and workability characteristics of the flame-retardant polymer composition.

The Applicant observed that the presence of ammonium coated montmorillonite eases the extrusion of the polymer composition containing it. In particular, the addition of ammonium coated montmorillonite in the above-mentioned amount decrease by 15-20% the viscosity of the polymer composition with respect to a composition not containing it.

The flame-retardant polymer composition for the outermost layer of the cable of the disclosure further comprises a polysiloxane as processing aid.

The amount of polysiloxane in the present flame-retardant polymer composition can range from 1 to 2 wt % (about 3-7 phr).

The polysiloxane may be any compound comprising a main chain of repeating —Si—O— unit and side chains chosen from a linear or branched alkyl group having from 1 to 6 carbon atoms, a linear or branched alkoxy group having from 1 to 6 carbon atoms, a linear or branched alkenyl group, e.g. vinyl group, having from 1 to 6 carbon atoms, a phenyl group, a phenoxy group and their combinations.

In an embodiment, the polysiloxane is polydimethylsiloxane.

The presence of at least one polysiloxane in the flame-retardant polymer composition for use in the manufacture of the outermost layer of the cable improves the compatibility between the flame-retardant fillers (in particular metal hydroxides such as magnesium hydroxide) with the polymer matrix of the composition by increasing the interactions between the hydroxyl groups of the fillers and the polyolefin chains thereby improving the dispersion of the inorganic filler in the polymer matrix. Moreover, the use of the aforementioned polysiloxanes in the polymeric composition helps to reduce the viscosity during extrusion thus improving the workability of the flame-retardant polymer composition.

The flame-retardant polymer composition may further comprise further conventional components such as antioxidants, processing aids, stabilizers, pigments, coupling agents, etc.

Conventional antioxidants which are suitable for this purpose are by way of example: polymerized trimethyldihydroquinoline, 4,4'-thiobis (3-methyl-6-tert-butyl) phenol, pentaerythritol tetrakis [3-(3,5-di-terz-butyl-4-hydroxyphenyl) propionate], 2,2'-thio-diethylene-bis-[3-(3,5-di-tert-butyl-4-hydroxy-phenyl) propionate] and the like or mixtures thereof.

Process aids usually added to the base polymer are, for example, calcium stearate, zinc stearate, stearic acid, paraffin wax, silicone rubbers and the like, and mixtures thereof.

The lubricants used are, for example, paraffin waxes of low molecular weight, stearic acid, stearammide, oleammide, erucamide.

The coupling agent may be used with the aim of further improving compatibility between the flame-retardant inorganic fillers such as magnesium hydroxide and polymer matrix. This coupling agent can be selected from those known in the art, for example: saturated silane compounds or silane compounds containing at least one ethylenic unsaturation; peroxides or mixtures thereof. As an alternative, a monocarboxylic acids or dicarboxylic acids anhydrides, optionally grafted onto the polymeric base, may be used.

The electrical cable according to the present disclosure may be produced based on cable manufacturing techniques known to those skilled in the art. In particular, the outermost layer may be formed using conventional processes with a thickness chosen to comply requirements and needs of the particular application for the cable.

The cable according to the disclosure can be used particularly for the transport of electric energy or data. In one embodiment, the cable according to the disclosure is used for the transport of low voltage electric currents (LV), i.e. electric currents having a voltage not exceeding 1 kV.

The present disclosure will now be described with reference to the following examples which are provided for purpose of illustration only and thus are not to be construed as limiting the scope of the present disclosure in any way.

EXAMPLE 1

Preparation of Test Compositions According to the Disclosure and Comparative Composition.

A comparative flame retardant polymer base composition (hereinafter referred to as Sample A) and test compositions according to the disclosure (hereinafter referred to as samples from B to E) have been prepared by mixing, in an open mixer, polymers, fillers and additives as indicated in the following Table 1.

The polymeric base was made of a mixture of metallocene LLDPE (having a density of 0.885 g/cm$^3$) and of LLPDE (having a density of 0.911 g/cm$^3$).

The metal hydroxide was natural magnesium hydroxide with no surface treatment. As ammonium coated montmorillonite, montmorillonite A had average particles dimensions of 7-9 µm, while montmorillonite B had average particles dimensions of 15-20 µm.

Table 1 shows the amounts of polyethylene base polymers and other additives and fillers in the compositions used to produce the outermost layer of the insulating coating of both comparative and test samples, where the comparative sample is marked with an asterisk.

The amounts are provided as percent by weight on the total weight of the composition.

TABLE 1

| Component | Sample A* | Sample B | Sample C | Sample D | Sample E |
|---|---|---|---|---|---|
| Metallocene LLDPE | 22.45 | 21.77 | 21.32 | 21.77 | 21.32 |
| LLDPE | 9.05 | 8.77 | 8.59 | 8.77 | 8.59 |
| Mg(OH)$_2$ | 64.13 | 62.21 | 60.92 | 62.21 | 60.92 |
| Montmorillonite A | — | 3.00 | 5.00 | — | — |
| Montmorillonite B | — | — | — | 3.00 | 5.00 |
| Polydimethyl siloxane | 1.50 | 1.45 | 1.42 | 1.45 | 1.42 |
| Stearic acid | 2.00 | 1.94 | 1.90 | 1.94 | 1.90 |
| Additives | 0.88 | 0.85 | 0.83 | 0.85 | 0.83 |

EXAMPLE 2

Tests on dripping under fire conditions.

The samples obtained according to Example 1 were tested to determine their dripping behaviour under fire conditions and for mechanical properties.

The dripping tests were aimed at detecting the time of falling the first piece of the samples (fall time) and the formation of cohesive carbon residues (chars) on them under fire conditions (anti-drop effect).

With regard to the evaluation of fall time and mechanical properties, three specimens from plates having dimensions 35×150 mm and 2.7 thick were obtained from each sample.

Each specimen of a sample was clamped vertically from an upper end portion with a clamp fixed on a support while the lower end was free. The specimen was then burned under the action of a flame produced by a bunsen fed with air at a flow rate of 3.8 ml/min and with liquid propane gas (LPG) at a flow rate of 0.65 ml/min, maintaining the ratio between mass flow rates used.

The flame was oriented at about 90° with respect to the specimen and directed towards the lower edge of the specimen at the shorter side thereof.

The flame was held in this position for all the time of the experiment and the time from approaching the flame at the lower edge of the specimen until the first piece from the specimen falls off (fall time) was recorded. The results are set forth in Table 2.

TABLE 2

| Sample | Fall time (seconds) |
|---|---|
| A* | 53 |
| B | 84 |
| C | 117 |
| D | 74 |
| E | 116 |

EXAMPLE 3

Mechanical Properties and Viscosity

The tensile strength of all the samples was evaluated according to IEC 60811-1-1 (1996). Samples B to E according to the disclosure had a tensile strength about 25% lower than that of sample A, but within the standard requirement anyway. The elongation at break of all the samples was evaluated according to IEC 60811-1-1 (1996). Samples B and D according to the disclosure had an elongation at break about 5% higher than that of sample A, while samples C and E according to the disclosure had an elongation at break about 10% lower than that of sample A but within the standard requirement anyway.

The viscosity of all the samples was evaluated according to ISO 289-1 (2015). Samples B to D according to the disclosure had viscosity about 15-20% lower than that of sample A.

The invention claimed is:

1. A flame-retardant electric cable having a core comprising at least one electric conductor, an electrically insulating coating, and an outermost layer made from a thermoplastic, low smoke zero halogen flame-retardant polymer composition, wherein the substantially thermoplastic low smoke zero halogen flame-retardant polymer composition comprises:
   a) a polymeric base made of at least one polyethylene homopolymer or copolymer having a density of 0.94 g/cm$^3$ at most;
   b) 60-64% by weight of a metal hydroxide;
   c) at least 2% by weight of an ammonium coated montmorillonite having average particle dimensions of from 5 to 20 μm; and
   d) a polysiloxane.

2. The flame-retardant electric cable according to claim 1, wherein the outermost layer is a jacket.

3. The flame-retardant electric cable according to claim 1, wherein the outermost layer is a skin layer.

4. The flame-retardant electric cable according to claim 3, wherein the skin layer has a thickness of from 0.05 to 0.5 mm.

5. The flame-retardant electric cable according to claim 1, wherein the polymeric base is made of at least one polyethylene copolymer.

6. The flame-retardant electric cable according to claim 5, wherein at least one polyethylene copolymer is a metallocene linear low density polyethylene.

7. The flame-retardant electric cable according to claim 1, wherein the polyethylene homopolymer or copolymer have a density in the range of 0.86 to 0.92 g/cm$^3$.

8. The flame-retardant electric cable according to claim 1, wherein the metal hydroxide is magnesium hydroxide.

9. The flame-retardant electric cable according to claim 1, wherein the amount of montmorillonite is comprised in the range from 2 to 8% by weight.

10. The flame-retardant electric cable according to claim 1, wherein the ammonium coated montmorillonite contains dimethyl, di(hydrogenated tallow) ammonium.

11. The flame-retardant electric cable according to claim 1, wherein the polysiloxane is comprised in the range from 1 to 2% by weight.

12. The flame-retardant electric cable according to claim 1, wherein the polysiloxane is polydimethylsiloxane.

* * * * *